(No Model.) 6 Sheets—Sheet 1.

A. H. SHOCK.
CIGAR BUNCHING MACHINE.

No. 422,455. Patented Mar. 4, 1890.

Witnesses,
Robt Everett
J. A. Rutherford

Inventor:
Abraham H. Shock.
By James L. Norris.
Atty.

(No Model.) 6 Sheets—Sheet 4.

A. H. SHOCK.
CIGAR BUNCHING MACHINE.

No. 422,455. Patented Mar. 4, 1890.

(No Model.) 6 Sheets—Sheet 5.
A. H. SHOCK.
CIGAR BUNCHING MACHINE.
No. 422,455. Patented Mar. 4, 1890.
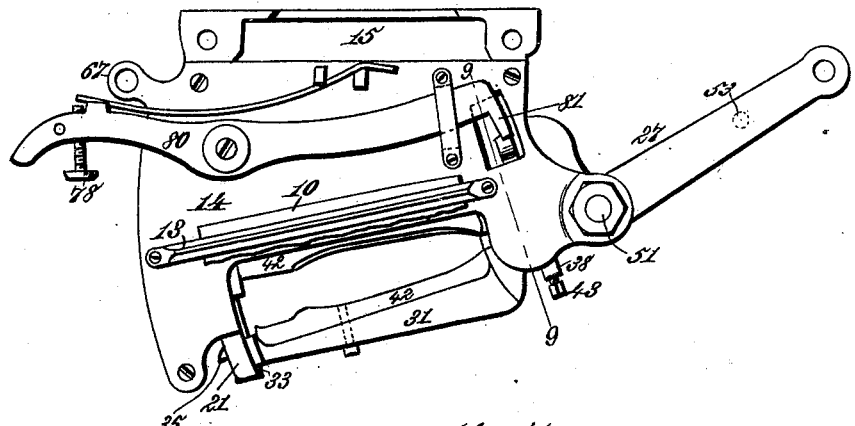
Fig. 6.
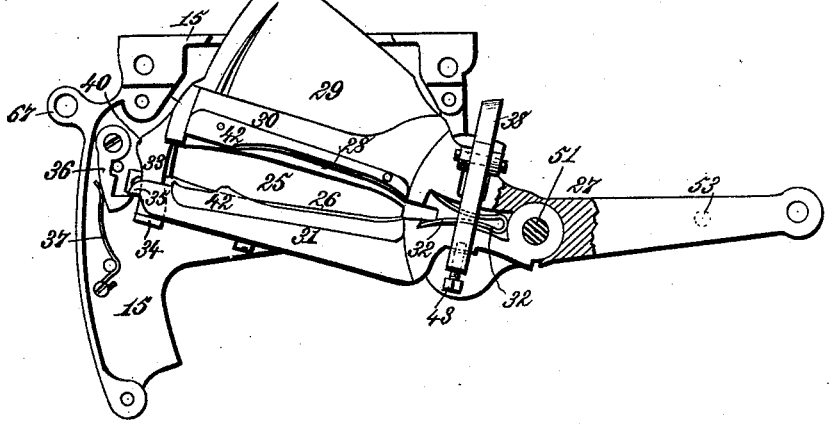
Fig. 7.
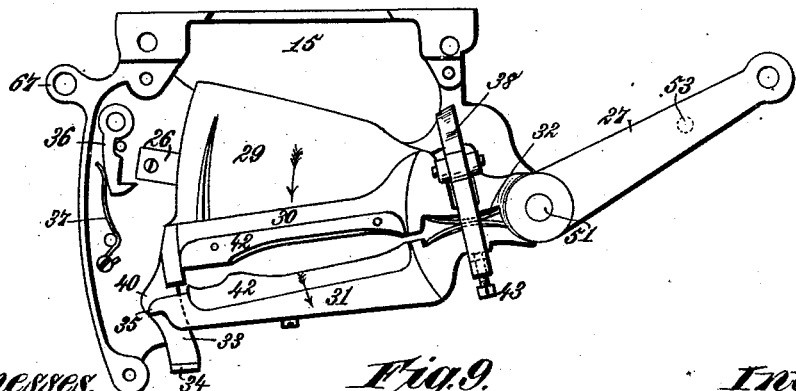
Fig. 8.
Fig. 9.
Witnesses. Inventor.
Abraham H. Shock.
By James L. Norris,
Atty.

(No Model.) 6 Sheets—Sheet 6.

A. H. SHOCK.
CIGAR BUNCHING MACHINE.

No. 422,455. Patented Mar. 4, 1890

Witnesses:
Robert Everett
James A. Rutherford

Inventor:
Abraham H. Shock
By James L. Norris
Atty.

N. PETERS, Photo-Lithographer, Washington, D. C.

UNITED STATES PATENT OFFICE.

ABRAHAM H. SHOCK, OF LANCASTER, PENNSYLVANIA, ASSIGNOR OF ONE HALF TO SAMUEL KAUFMAN, OF SAME PLACE.

CIGAR-BUNCHING MACHINE.

SPECIFICATION forming part of Letters Patent No. 422,455, dated March 4, 1890.

Application filed April 19, 1889. Serial No. 307,786. (No model.)

*To all whom it may concern:*

Be it known that I, ABRAHAM H. SHOCK, a citizen of the United States, residing at Lancaster, in the county of Lancaster and State of Pennsylvania, have invented new and useful Improvements in Cigar-Bunching Machines, of which the following is a specification.

My present invention relates to certain improvements in the cigar making or bunching machine described in application Serial No. 275,447, filed by me May 29, 1888; and it consists in the novel features of construction and combinations of parts hereinafter set forth.

Figure 1:
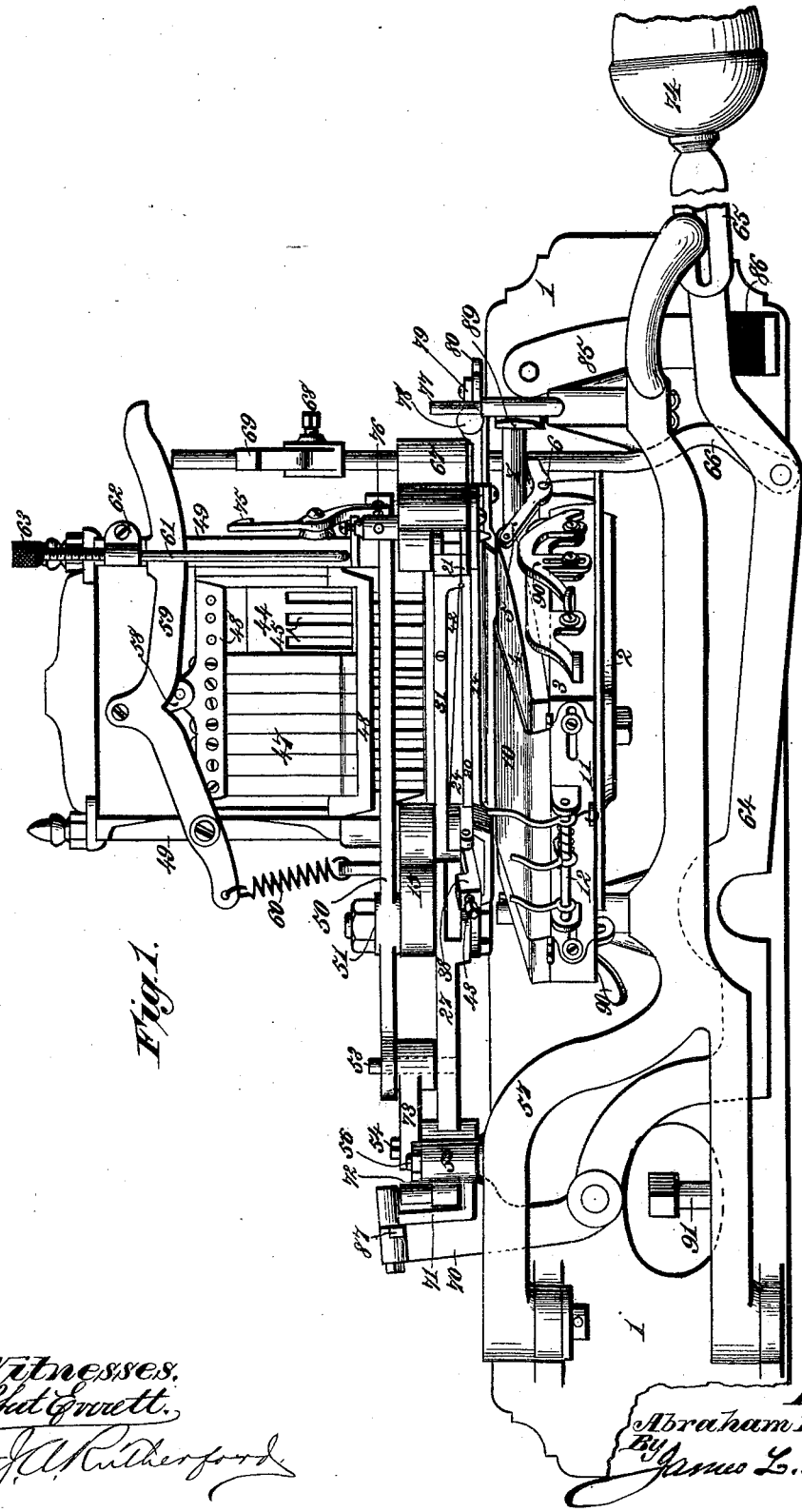
Figure 2:
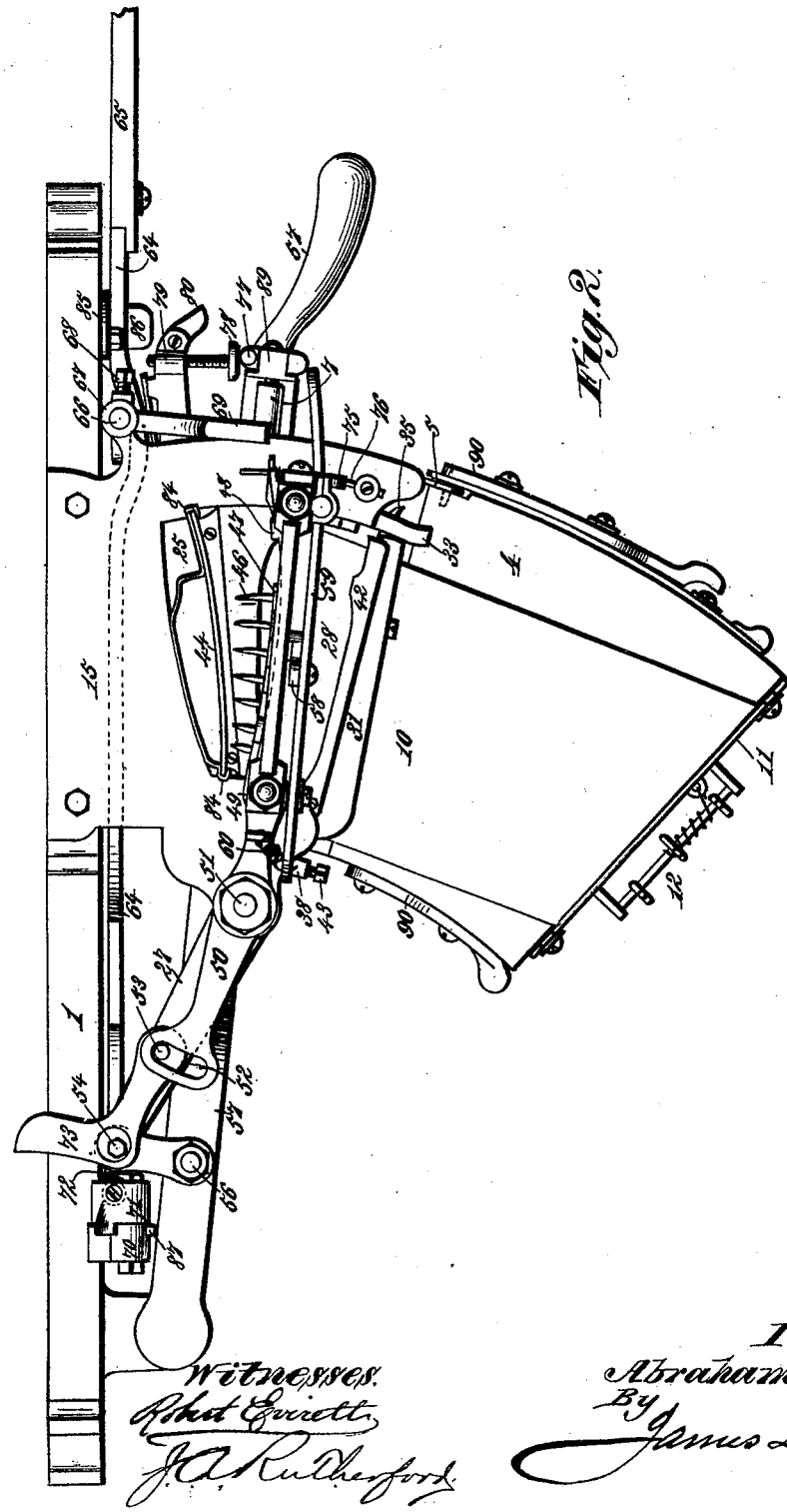
Figure 3:
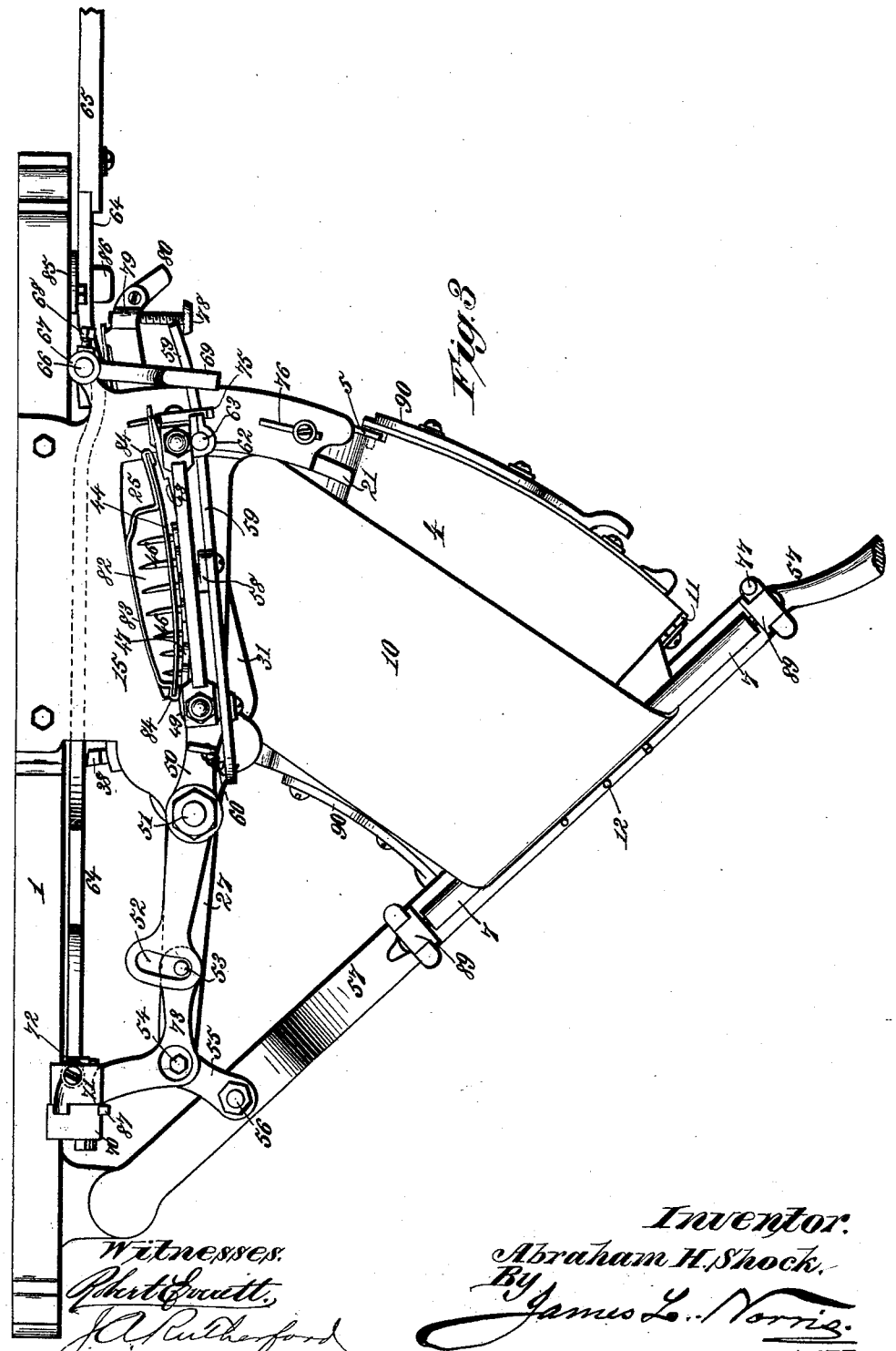
Figure 4:
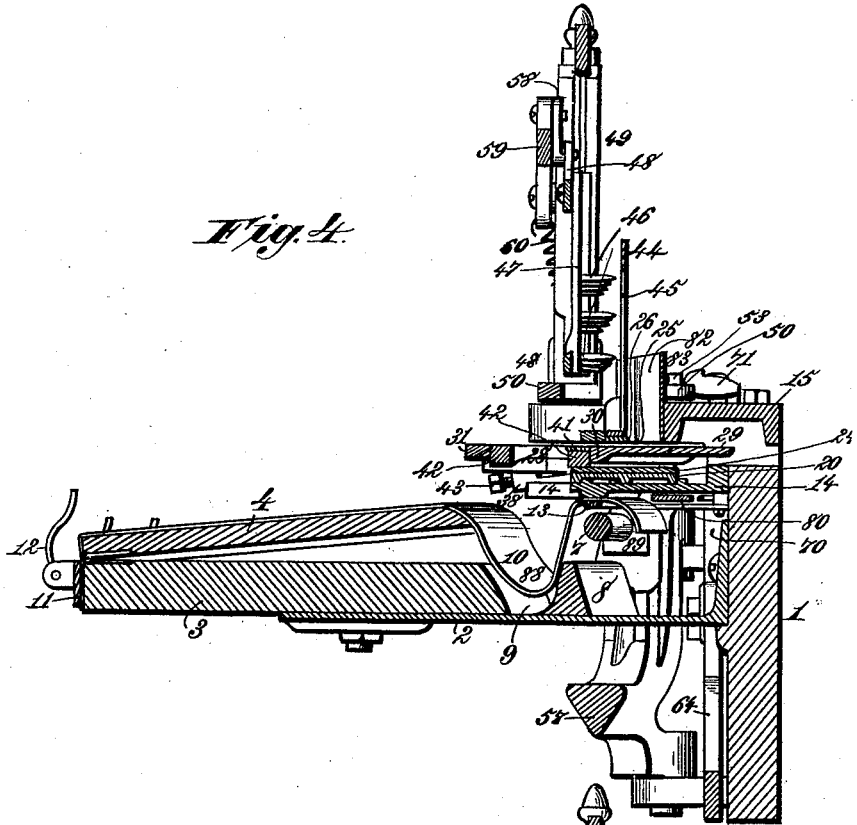
Figure 5:
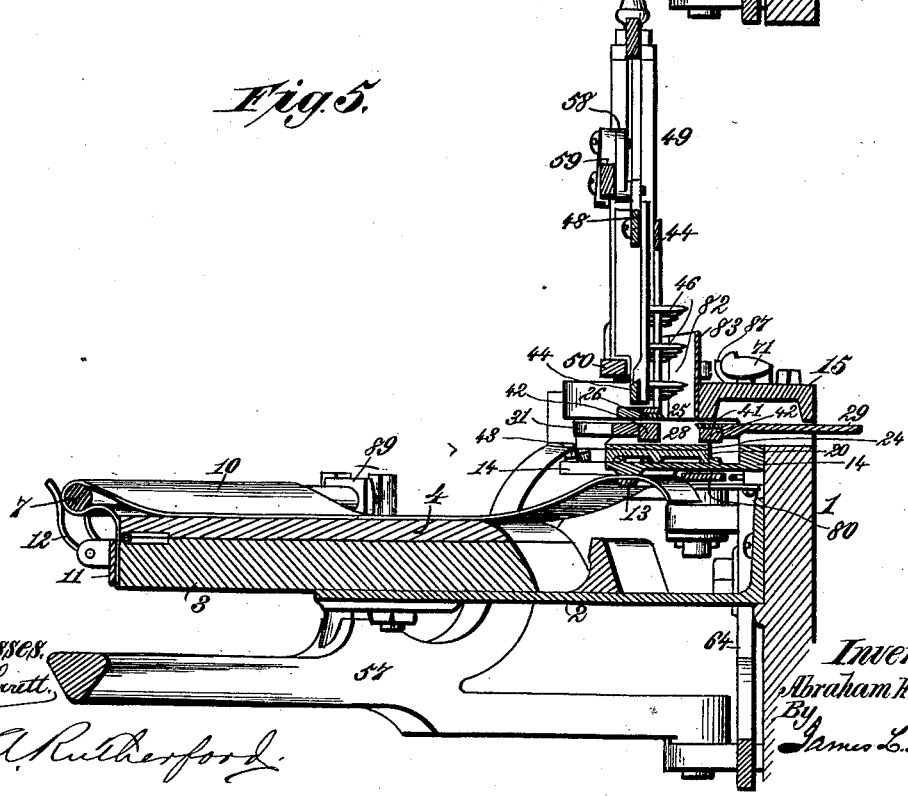
Figure 10:
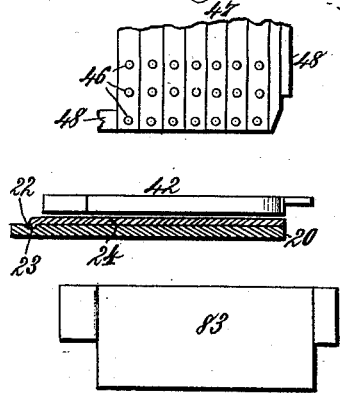
Figure 11:
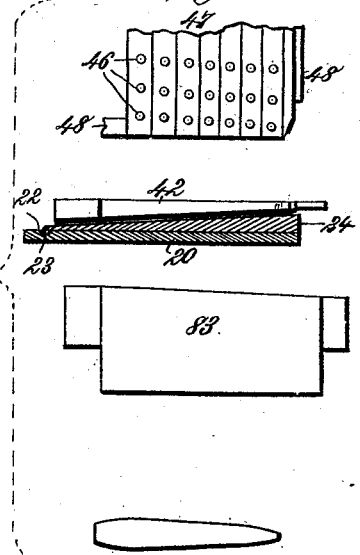
Figure 12:
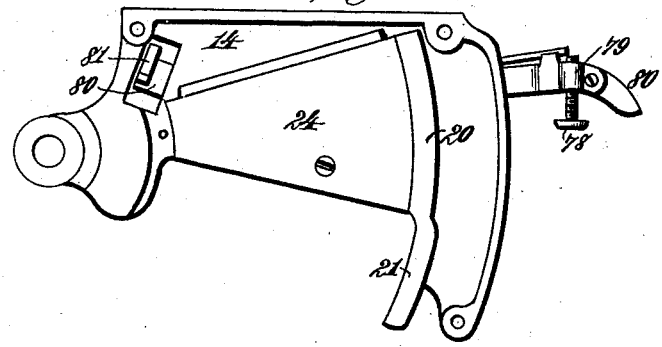
Figure 13:
Figure 14:
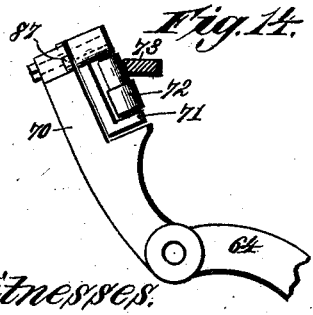
Figure 15:
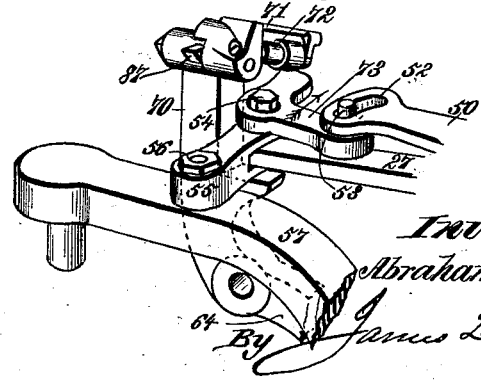

In the annexed drawings, illustrating the invention, Figure 1 is a front elevation of my improved cigar-bunching machine. Fig. 2 is a plan of the machine, showing various parts in the position they occupy when the main operating-lever has completed its rearward stroke or is beginning its forward stroke. Fig. 3 is a similar view of the machine at the completion of the forward stroke of the main operating-lever. Fig. 4 is a vertical transverse section of the machine with the feed mechanism elevated and withdrawn from the hopper and the compression-chamber moved forward and expanded in position to discharge its contents at the completion of the rearward stroke of the main lever. Fig. 5 is a similar section showing the feed mechanism engaged in the hopper and depressed therein to feed the tobacco into the compression-chamber, which is shown in the position it occupies beneath the hopper at the completion of the forward stroke of the main lever. Fig. 6 is an inverted plan of the upper table inclosing the compressing mechanism, which is in position to discharge the compressed bunch. Fig. 7 is a similar view with the bottom plate removed and the compression-chamber in line with the feed-opening. Fig. 8 is a similar view with the valve in position to close the feed-opening, and showing the locked compression-chamber in its forward movement. Fig. 9 is a section on the line 9 9 of Fig. 6. Fig. 10 illustrates an arrangement of the feed-teeth, the compression devices, and the removable hopper-back for making a straight bunch. Fig. 11 illustrates an arrangement of feed-teeth, compression devices, and hopper-back for a tapered cigar-bunch. Fig. 12 is a plan of the bottom plate of the upper table with its lower lining. Fig. 13 is a perspective view of removable linings for the compression-jaws. Figs. 14 and 15 are detail views of a portion of the weighted feed-actuating lever, showing its connection with its tripping mechanism and with the main operating-lever and the levers that connect with the feeding and the compressing devices.

Referring to the drawings, the numeral 1 designates a stationary metallic-frame which forms the supporting part of the tobacco-feeding and bunch-forming mechanism, and may be attached to a work-bench or other support in any suitable or convenient manner.

From the front of the frame 1, near one end, projects a plate 2, preferably of metal, to which the bunch-rolling board 3 is adjustably bolted in the usual manner. This bunch-rolling board may be of any suitable or well-known construction; but I prefer to make it with an upper automatically-adjustable leaf 4, the forward end of which is hinged to the front edge of the lower or stationary portion of said board. The rear end of the leaf 4 is connected to one end of a curved lever 5, that is centrally fulcrumed to a lug 6, projecting from one side edge of the plate 2, on which the bunch-rolling board is supported. The other end of this lever 5 projects rearward and upward in the path of the bunching-roller 7, which in its rearward stroke comes in contact therewith, so as to depress the rear end of said lever and thereby raise the rear end of the leaf 4 nearer to the tobacco feeding and compressing mechanism, for the purpose hereinafter explained.

Secured diagonally to the plate 2, adjacent to the rear end of the bunch-rolling board, is a strip 8, having its front surface somewhat beveled or concaved longitudinally to correspond to a similar bevel on the rear edges of the bunch-rolling board and its hinged leaf. The space between the strip 8 and the bunch-rolling board thus forms a diagonal recess 9, which may be tapering or have a greater width at one end than at the other. By loosening the nuts and bolts that hold the bunch-rolling board 3 in place it can be swung slightly in the arc of a circle to either the right or the left, as necessary, and so vary the taper of the diagonal recess 9 as may be required to accord to the taper or form of cigar-bunch desired. The strip 8 may also be made adjustable by means of bolts and nuts to make it parallel with the rear edge of the bunch-rolling board when a straight cigar-bunch is to be made.

The bunch-rolling apron 10 has its forward portions attached to the front edge of the bunch-rolling board 3 by means of the metallic plate or bar 11, that carries an automatic bunch-receiver 12 of the ordinary construction. The rear end of this bunch-rolling apron is attached by means of clamping-bars 13 to the under side of the bottom plate 14 of an upper hollowed table or shelf 15, that projects forward from the upper portion of the frame 1, as usual. The bottom plate 14 is removable and has engaged with its upper side a removable and interchangeable lower lining 20 of segmental form, having at one end a forward-projecting curved arm 21, for a purpose presently explained. On the upper surface of this lower lining or plate 20, near one end, is a curved groove 22 to receive a curved lip 23 on the end of a removable and interchangeable upper lining 24, with which the filler comes in direct contact. The upper lining 24 is secured in place by means of a screw, Fig. 12, passed through it and into and through the lower lining. This upper lining may have a flat upper surface, as shown in Fig. 10, for forming the bunch for a straight cigar, a beveled or inclined upper surface, as shown in Fig. 11, for forming the bunch for a tapered cigar, or it may be shaped to correspond with the required form of a bunch for a barrel-shaped cigar, or one tapered at both ends. By making these linings interchangeable and of any shape necessary to conform to the character of cigar to be made they can be readily removed and replaced, so as to adapt the machine for making a variety of shapes.

In the top of the upper table 15 is an approximately-cigar-shaped opening 25, having a detachable stationary knife 26 along its front edge. To a lug or projection at one end of the upper table is pivoted a horizontally-oscillatory arm 27, which carries an automatically-actuated compressing-chamber 28, for compressing the tobacco fed through the cigar-shaped opening 25, and a valve 29, that is adapted to close the under side of the opening 25 and cut off the further feed of tobacco when the compressing-chamber is swung from beneath said opening. The valve 29 and the compressing-jaw 30 are integral or rigid with the oscillatory arm 27, while the compressing-jaw 31 is pivotally connected to said arm.

Between the jaw 30 and the pivotal end of the jaw 31 is a spring 32, that throws the front jaw forward and releases the compressed tobacco at the proper time. The end of the jaw 30 is provided with a forward-projecting arm 33, having at its end a stop 34 to limit the outward movement of the jaw when released.

On the end of the jaw 31 is a catch 35, adapted to engage a pivoted hook 36, that is provided with a spring 37 to hold it in engagement with said catch. When the oscillatory arm 27 is actuated in the proper direction to move the valve 29 backward from beneath the opening 25, the catch 35 on the jaw 31 will engage the pivoted hook 36, and the compressing-chamber 28 will be in position to receive tobacco through said opening, as shown in Figs. 5 and 7. On the reverse movement of the arm 27, actuated as hereinafter explained, the tobacco filler will be compressed between the jaws 30 and 31, and the jaw 31 will remain engaged with the hook 36 long enough to permit said jaws 30 and 31 to be locked by a hooked catch 38 on the jaw 30, said catch being actuated by a spring 39 beneath one end. The jaws 30 and 31 being now locked together and holding the compressed tobacco, the movement of the arm 27 causes the valve 29 to cut off the passage of any more tobacco through the opening 25, and a cam 40 on the jaw 30 pushes back the hook 36 and permits the compressing-chamber 28 to move forward across the lining-plate 24 toward the front lower edge of the upper table. In this movement the free ends of the compressing-jaws 30 and 31 travel along and are supported by the curved arm 21 of the lower lining-plate 20, and the tobacco is cut off against the fixed knife 26 by means of a knife-edge 41, carried by the rear compressing-jaw.

The compressing-jaws 30 and 31 are provided with detachable linings 42, on one of which the knife-edge 41 is formed. These linings are shaped to correspond to the lining 24, over which the compressing-jaws are made to travel, the opposing surfaces of said linings 24 and 42 being alike flat, beveled, or concaved, according to whether a straight, tapered, or barrel-shaped cigar-bunch is to be formed. The knife-edge 41 is located on the upper edge of the rear jaw-lining 42, which upper edge is straight or horizontal to correspond to the fixed horizontal knife 26, that is supported by the upper table. By making the linings 24 and 42 detachable they can be readily interchanged with others of different form to correspond to the desired shape of cigar-bunch, while, the cutting-edges 26 and 41 being in all cases horizontal, any liability of cutting through the head of the bunch is avoided.

It will be understood that the inner or opposing faces of the jaw-linings 42 will also be shaped to conform to the shape of bunch desired, and the bunch can be made more or less solid or loose by adjusting a screw-bolt 43 in the hooked end of the catch 38, whereby said catch can be made to vary the distance between the closed compressing-jaws, and thus regulate the degree of compression.

Attached to the upper table 15 in front of the elongated feed-opening 25 is a slightly-curved plate 44, having a series of vertical slots 45 for the passage of the feed pins or teeth 46, that project rearward from a series of removable vertically-arranged bars 47, that are detachably secured to a rectangular sliding frame 48, which is vertically movable in guide-standards 49, carried by a horizontally-oscillatory support 50, which is pivoted at 51 to the upper face of the table. The outer end of the oscillatory support 50 is provided with a slot 52, that loosely engages a stud 53 on the oscillatory arm or lever 27, which carries the compressing-chamber and attached feed-valve, as already described. The outer end of the oscillatory arm or lever 27 is provided with a stud 54 for attachment of a knee-joint 55, that connects with a stud 56 on the swinging bracket-arm or main operating-lever 57, that carries the bunching-roller 7 and is pivoted to the main frame 1, as usual.

The rectangular vertically-sliding feed-frame 48 is suspended by means of a link 58 from a feeding-lever 59, that is fulcrumed to one of the vertical guide-standards 49 of the feeding mechanism.

To one end of the lever 59 is attached a spiral spring 60, by which that end of the lever is drawn down, so as to move the frame 48 upward and normally hold the feed-teeth 46 in an elevated position. The other end of the lever 59 moves in and projects beyond a guide-loop 61 on the other vertical guide-standard.

In the upper end of the guide-loop 61, supported in an adjustable split bearing 62, is a screw-threaded vertically-movable stop-pin 63, that can be adjusted up or down to control the upward throw of the feed-lever 59, and so regulate the quantity of tobacco fed to the compressing-chamber.

To the frame 1, near the pivotal end of the main operating-lever 57, is fulcrumed a feed-actuating lever 64, which carries a longitudinally-extensible arm 65 at its free end. The lever 64 is parallel to and in close contact with the main frame 1 and is arranged below the plate or bracket 2, that supports the bunch-rolling board.

To the lever 64, near its outer or free end, is loosely connected a vertical rod 66, which moves in a guide 67 in the upper table. This rod 66 supports by means of a set-screw 68 a vertically-adjustable forward-projecting arm 69, that is adapted at the proper time to bear on the projecting end of the lever 59, and thereby depress it against the action of the spring 60, so as to cause the feed-teeth 46 and their supporting frame-work to descend for the purpose of feeding tobacco to the compressing mechanism. The pivotal end of the lever 64 is provided with an upward-extending arm 70, from the upper end of which is pivotally suspended a journal-box 71, in which an anti-friction roller 72 is supported.

Above the knee-joint 55 and connected with the studs 53 and 54 is a bell-crank 73, one arm of which projects backward in position to engage the anti-friction roller 72 during the outward stroke of the main operating-lever 57, to which said bell-crank is connected. While the main operating-lever 57 is being moved outward the bell-crank 73, in passing forward, bears on the side of the anti-friction roller 72 in such a manner as to cause the lever-arm 70 to tilt laterally outward and thereby raise the lever 64, with its vertical rod 66 and arm 69, into operative position for actuating the feeding mechanism. During the outward stroke of the lever 57 the oscillatory support 50 is actuated through its connection with said lever in such a manner as to carry the elevated vertically-sliding feed-frame 48 backward until the feed-teeth 46 pass through the vertical slots 45 in the plate 44 at the front of the feed-opening, and at the same time the expanded compression-chamber 28 is carried by the movement of the arm 27 beneath the feed-opening. As soon as the lever 57 completes its forward stroke the bell-crank 73 slips in front of and becomes disengaged from the anti-friction roller 72, thereby releasing the lever-arm 70 and permitting the connected feed-actuating lever 64 to descend under the influence of a weight 74, attached to its extensible arm 65, which arm can be adjusted out or inward to increase or lessen the leverage, as required. The lever 64 in descending carries the arm 69 into forcible contact with the projecting free end of the lever 59, thereby forcing the feed-teeth 46 down in line with the feed-opening 25 until the lever 59 is engaged and locked by a spring-catch 75, attached to one of the vertical guide-standards 49 of the feed mechanism. The tobacco filler is thus fed through the opening 25 into the compressing-chamber 28, and is held pressed down therein until on the next inward stroke of the lever 57 the feed-teeth 46 are moved outward horizontally through the slots 45 and the valve 29 is moved out beneath the feed-opening, thus cutting off the further access of tobacco to the compressing-chamber 28, in which the tobacco now becomes compressed by reason of the forward jaw 31 remaining engaged with the hook 36, while the rear jaw 30 moves forward with the valve. The jaws 30 and 31 next become locked by the hooked catch 38 under the action of the spring 39, and the cam 40 on the fixed jaw pushes back the hook 36 and permits both compressing-jaws to move forward together to the front of the upper table. Just before the lever 57 completes its inward stroke the lower end of the spring-catch 75 comes in contact with an adjustable stop 76 on the upper table 15, and thereby releases the lever 59 and permits the feed-teeth and their vertically-sliding carrying-frame to rise under the action of the spring 60 to their normal elevated position. At the completion of the rearward stroke of the lever 57 a stud 77, carried by said lever, comes in contact with an adjustable stop 78, supported in an adjustable split bearing 79 on one end of a horizontally-movable spring-lever 80, that carries a cam 81 on its other end. The outer end of the lever 80 is thus forced backward and its cam 81 carried beneath and made to trip the catch 38, so as to release and expand the compressing-jaws 30 and 31 under the action of their spring 32, thereby discharging the compressed tobacco filler into a pocket that has been previously formed in the bunch-rolling apron. The lower portion of the vertically-slotted plate 44 forms the front of a feed-hopper 82, having a removable back piece 83, that is provided at its ends with guide-flanges 84 to engage the ends of the slotted plate.

In order to properly gage the quantity of tobacco necessary for the form and kind of bunch to be made, a number of interchangeable back pieces 83 are provided, each of which can be withdrawn vertically and replaced by another of different form and dimensions, to vary the capacity of the hopper, according to the length of filler to be used and the bulk or quantity of tobacco required for forming cigar-bunches of the desired shape and size. The capacity of the hopper 82 may be such as to enable it to hold at one time a quantity of tobacco sufficient for three or more bunches. If straight bunches are to be formed, the upper edge of the back piece 83 will be straight, so as to be in a horizontal line when the back piece is in place; but if tapered or barrel-shaped bunches are to be made the upper edge of the back piece will be given a corresponding inclination or curvature, as the case may be, and thus serve as a gage for the operator in filling the hopper, so that as the tobacco is fed straight down through the hopper by the action of the feed-teeth 46, and thus forced into the compression-chamber 28, each part of the bunch will receive the proper thickness and bulk of tobacco necessary to produce a properly-formed cigar-bunch of the required size and shape. It will be observed that the length of the hopper, as determined by the form of the back piece employed, should be somewhat less than the length of the interior of the compressing-chamber 28, so as to facilitate the passage of the tobacco into and through said compression-chamber at the proper time and enable it to spread at the ends and fill the said chamber, under the action of the compressing-jaws, without binding and sticking in the chamber when the jaws are released to discharge the bunch. When the linings 24 and 42 are changed to correspond to the form of bunch to be made, as already described, a back piece 83, having a horizontal or inclined or a curved upper edge, will be attached to the slotted front plate 44, as may be required. By attaching each vertical row of feed-teeth 46 to a separate and independently-removable vertical supporting-bar 47, as shown, the number of teeth-rows can be readily varied to conform to the length of the hopper as determined by the particular shape of back piece employed. The length of the feed-teeth 46 on the several detachable and interchangeable bars 47 will depend on the varying width of the hopper at different points in its length, and the teeth will be long or short and straight, beveled, or somewhat curved to conform to the width and shape of the hopper.

In order to feed the tobacco down in a straight line and in proper bulk at different points to conform to the upper surface of the lining 24, which may be either flat, beveled, or concaved, as before described, the teeth on the several bars will be set either in horizontal, inclined, or curved lines, as may be required, to correspond with the shape of bunch to be formed.

This machine is especially adapted for the bunching of long-filler tobacco, though it may be used for making cigar-bunches from loose or scrap tobacco. Its operation, it will be seen, is in many respects similar to that of the machine described in my above-named former application. The hopper being supplied with a suitable quantity of tobacco, while the feed-opening 25 is closed by the valve 29, the forward movement of the main operating-lever 57 in the arc of a circle will cause the said valve to move backward and carry the expanded compression-chamber 28 beneath and in line with the hopper. The bell-crank 73, bearing on the anti-friction roller 72, will raise the weighted lever 64 and hold it for the time being in an elevated position. The pivoted support 50, connected with the main lever 57, will carry the elevated vertically-sliding frame 48 backward until the feed-teeth 46 pass through the slots 45 in the front of the hopper, and when the forward stroke of the lever 57 is completed the bell-crank 73, slipping past the anti-friction roller 72, will release the weighted lever 64 and permit it to fall along the wearing-surface 85 and in contact with an elastic-faced stop or buffer 86, supported by the machine-frame. The quick descent of the weighted lever 64, which occurs on the instant that the lever 57 completes its forward stroke, carries the forward-projecting arm 69 into forcible contact with the lever 59, thereby depressing the teeth 46 and causing them to feed tobacco from the hopper 82 into the compression-chamber 28 until the lever 59 is engaged and locked by the spring-catch 75, the lower feed-teeth being then a short distance above the stationary knife 26, that is located at the front of the feed-opening.

On the rearward movement of the main operating-lever 57, carrying the bell-crank 73, the latter pushes back the loosely-suspended journal-box 71 of the anti-friction roller 72, without acting on the weighted lever 64, which is thus allowed to remain in a lowered position until the next forward movement of the main lever. A stop 87 on the lever-arm 70 limits the backward swing of the pivoted journal-box 71 and permits it to drop again into a vertical position when the bell-crank has passed. The continued rearward movement of the lever 57 causes the teeth 46 to move out through the slots 45 and releases the lever 59 by the contact of the spring-catch 75 with the stop 76, thus permitting the teeth to be elevated by the action of the spring 60. The catch 35 of the movable or spring compression-jaw 31 becomes engaged with and is held by the hook 36. The valve 29 and attached jaw 30 are moved forward, thereby closing the feed-opening 25 and compressing the tobacco into a bunch of the desired form, as determined by the shape of the compression-chamber, and the jaws are locked by the spring-catch 38, which has been previously adjusted by means of the screw-bolt 43 in its hooked end, so as to hold the jaws 30 and 31 at the proper distance apart to maintain the required degree of compression until the bunch is discharged. In passing the stationary knife 26 the knife-edge 41 on the lining 42 of the rear compression-jaw 30 cuts off in a straight line the tobacco in the compression-chamber 28 from that remaining in the hopper without cutting through or spoiling the bunch, and the feed-teeth 46 are not withdrawn from the hopper until the cutting off of the tobacco is completed by the full movement of the valve 29 beneath the feed-opening. After the bunching-roller 7, carried by the main lever 57, has passed the recess 9 of the bunch-rolling board on the rearward stroke of said lever, the operator should press the slack of the apron 10 into said recess to form a pocket 88 and lay a bunch-binding wrapper therein. As the rearward movement of the lever 57 continues, the cam 40 on the end of the rear compression-jaw 30 pushes back the hook 36 from its engagement with the catch 35 of the front or spring jaw 31, and said jaws 30 and 31, locked together by the catch 38, are permitted to move forward to the front of the table 15 and above the pocket 88, formed in the bunch-rolling apron. In its backward movement the bunching-roller 7 passes over and in contact with the lever 5, thereby raising the hinged leaf 4 of the bunch-rolling board into an inclined position and carrying the front edge of the pocket 88 toward the forward position of the compression-chamber, so as to diminish the distance through which the bunch is to be dropped, and thus prevent scattering or spreading of the tobacco. At the completion of the rearward stroke of the lever 57 it actuates the lever 80 and attached cam 81 to trip the spring locking-catch 38, thereby releasing the spring compression-jaw 31 and discharging the bunched tobacco into its wrapper in the pocket of the bunch-rolling apron. Now on the next forward stroke of the main operating-lever 57 the feed-opening 25 will be uncovered by the valve 29, the compression-chamber 28 will take its former position beneath the hopper 82, the weighted lever 64 and arm 69 will be raised into operative position, and the feed-teeth 46 will be moved back into the hopper, which has in the meantime received a further supply of tobacco. The forward movement of the bunching-roller 7, acting on the lever 5, depresses the inclined leaf 4 of the bunch-rolling board and carries the slack of the apron 10 over the bunched tobacco. As this forward movement of the bunching-roller is continued along the surface of the bunch-rolling-board leaf 4, the bunched tobacco is closely gathered in the bight of the apron and smoothly and compactly rolled in the binder or wrapper. The bunching-roller 7 is preferably journaled in yielding bearings 89, carried by the main lever 57, so that by means of one or more adjustable lifts 90, attached to the sides of the bunch-rolling board, said roller can be adjusted at either end to maintain the required form or taper of the bunch while it is being rolled forward to the receiver 12, in which it is deposited. The completion of the forward stroke of the main lever 57 instantly releases the weighted feed-actuating lever 64, and the several operations above named are consecutively repeated at each forward and rearward stroke of the said lever 57, which may be operated either by hand or by suitable power applied through a link or connecting-rod to be attached to a stud 91, located at a convenient point on the main lever.

What I claim as my invention is—

1. In a cigar-bunching machine, the combination of a bunch-rolling board having an automatically and vertically adjustable leaf hinged to the front edge of the said board and projecting backward above the same, a pivoted lever connected to the rear part of said leaf, a reciprocating bunching-roller which on its rearward stroke is adapted to bear on said lever and thereby raise the rolling-board leaf to an inclined position, a bunch-rolling apron, and tobacco feeding and compressing mechanism, substantially as described.

2. In a cigar-bunching machine, the combination of a bunch-rolling board having an adjustable diagonal recess and an adjustable upper leaf hinged to and extending backward from the front of the board to the front edge of the said recess, a lever connected to said leaf, a reciprocating bunching-roller which on its rearward movement will bear on said lever and thereby raise the rolling-board leaf to an inclined position, a bunch-rolling apron 10, and tobacco feeding and compressing mechanism, substantially as described.

3. In a cigar-bunching machine, the combination of a hollowed table or shelf having a feed-opening and provided with a removable bottom plate, a lower lining-plate detachably engaged with the upper surface of said bottom plate, an upper removable and interchangeable lining-plate engaged with the lower lining-plate and having an upper surface to conform to the shape of the bunch to be made, a horizontally-oscillatory compression-chamber having detachable and interchangeable lining-plates conforming to the plane of said upper lining-plate and also conforming to the desired shape of bunch, and a hopper having a removable and interchangeable back piece provided with an upper edge corresponding to the plane of the upper lining-plate to serve as a gage to indicate the proper bulk of tobacco to be placed in the different parts of the hopper to produce a bunch of the required form, substantially as described.

4. In a cigar-bunching machine, the combination of a hopper, a table having a feed-opening located beneath said hopper, a stationary horizontal knife detachably supported at the front edge of said feed-opening, and a horizontally-oscillatory compression-chamber composed of front and rear jaws having detachable lining-plates conforming to the desired shape of bunch, a horizontal knife-edge being formed on the upper face of the lining-plate of the rear jaw, substantially as described.

5. In a cigar-bunching-machine, the combination of a table having a feed-opening and provided with a removable bottom plate, a lower lining-plate supported on said bottom plate and provided at one end with a forward-projecting curved arm, an interchangeable upper lining-plate engaged with and supported on the lower lining-plate, and a horizontally-oscillatory arm carrying a valve and a compression-chamber that are located between the feed-opening and said upper lining-plate, the outer end of the compression-chamber being afforded a support on the arm of the lower lining-plate, substantially as described.

6. In a cigar-bunching machine, the combination of an oscillatory arm carrying a compressing-chamber composed of a rear jaw having an arm provided with a cam and a stop, and a spring-jaw having a catch, a forward spring-hook adapted to engage said catch until released by the cam on the other jaw, a hooked locking-catch having an adjustable screw-bolt in its hooked end, whereby the jaws of the compressing-chamber can be locked at the desired distance apart to hold their contents at the required degree of compression, a cam to release the hooked locking-catch, and a spring located between the said jaws of the compressing-chamber, substantially as described.

7. In a cigar-bunching machine, the combination of the table having a feed-opening, a vertically-slotted plate secured to the table in front of said opening and forming the front of a hopper having a detachable back piece supported by said slotted front plate, a horizontally-oscillatory support provided with guide-standards, a rectangular frame adapted to slide vertically in said standards, and a series of removable and interchangeable vertical bars carried by said rectangular frame, and each provided with a series of feed-teeth, substantially as described.

8. In a cigar-bunching machine, the combination of the hopper having a slotted front, a horizontally-oscillatory and vertically-sliding frame carrying feed-teeth adapted to enter the slotted front of the hopper, a feed-lever connected with said frame, a spring attached to said lever to hold the feed-teeth in a normally-elevated position, and a weighted feed-actuating lever having a rod carrying an arm to engage and depress the feed-lever when the feed-teeth are engaged in the hopper, substantially as described.

9. In a cigar-bunching machine, the combination of a hopper having a slotted front, a horizontally-oscillatory support provided with guide-standards, a feed-lever pivoted to one of said standards and provided with a spring, a spring-catch attached to the other standard and adapted to engage and lock said lever when depressed, a frame engaging the guide-standards and suspended from said lever, feed-teeth carried by said frame, a main lever through which the horizontally-oscillatory support is operated, a weighted feed-actuating lever having near its free end a vertical rod carrying a forward-projecting arm to depress the feed-lever and provided at the pivotal end with an upward-projecting arm, a swinging journal-box suspended from the latter arm and carrying an anti-friction roller, and a bell-crank connected with the main operating-lever and adapted to engage said roller to raise the weighted lever, substantially as described.

10. In a cigar-bunching machine, the combination of a hopper having a vertically-slotted front and an interchangeable back, a horizontally-oscillatory compression-chamber located beneath the hopper, a horizontally-oscillatory and vertically-sliding frame provided with feed-teeth and having a feed-lever and locking devices, a weighted feed-actuating lever carrying an arm to engage and depress the feed-lever, a bunch-rolling board, a bunching-apron, a main operating-lever carrying a bunching-roller, and connections through which the feeding and compressing devices are actuated from said main operating-lever, substantially as described.

11. In a cigar-bunching machine, the combination of the table 15, having a feed-opening 25 and a detachable bottom plate 14, the removable and interchangeable lower lining 20, having a forward-projecting arm 21, the removable and interchangeable upper lining 24, a horizontally-oscillatory compressing-chamber 28, composed of jaws 30 and 31, provided with removable and interchangeable linings 42, one of which is provided with a knife-edge 41, the stationary knife 26, a hopper having a slotted front and a removable back piece 83, having an upper edge conforming to the plane of the contacting surfaces of the linings 24 and 42, and a horizontally-oscillatory and vertically-sliding frame carrying feed-teeth 46, arranged to correspond to the length, width, and form of the hopper, substantially as described.

12. In a cigar-bunching machine, the combination, with the arm 27, carrrying a jaw 30, provided with an arm 33 and cam 40, and a jaw 31, having a catch 35, of the spring 32, the spring-hook 36, the catch 38, having an adjustable screw-bolt 43, and the spring-lever 80, having a cam 81, substantially as described.

13. In a cigar-bunching machine, the combination of the table 15, having a feed-opening 25, the front hopper-plate 44, provided with vertical slots 45, the horizontally-oscillatory support 50, having guide-standards 49, the vertically-sliding frame 48, the removable and interchangeable vertical bars 47, provided with teeth 46, the lever 59, link 58, spring 60, the spring-catch 75, the adjustable stop 76, the weighted feed-actuating lever 64, carrying a rod having an arm 69, and the main operating-lever 57, through which the horizontally-oscillatory support 50 and the weighted feed-actuating-lever 64 are operated, substantially as described.

14. In a cigar-bunching machine, the combination of a horizontally-oscillatory compression device provided with a lever-arm 27, having studs 53 and 54, a horizontally-oscillatory feed-support 50, having a slot 52, that loosely engages the stud 53, the main operating-lever 57, having a stud 56, and the knee-joint 55, connecting the studs 54 and 56, substantially as described.

15. In a cigar-bunching machine, the combination, with a horizontally-oscillatory and vertically-movable feed device, of a weighted lever 64, carrying a rod 66, having a projecting arm 69 and provided at its pivotal end with an upward-projecting arm 70, a swinging journal-box 71, suspended from the arm 70 and carrying an anti-friction roller 72, the main operating-lever 57, the knee-joint 55, and the bell-crank 73, connected to the lever 57, substantially as described.

In testimony whereof I have affixed my signature in presence of two witnesses.

ABRAHAM H. SHOCK.

Witnesses:
GEO. A. LANE,
L. E. OLMAKER.